United States Patent [19]

Kaltmann

[11] 3,813,790

[45] June 4, 1974

[54] SIGHTING MEANS FOR FIREARMS

[75] Inventor: Hans-Joachim Kaltmann, Dusseldorf, Germany

[73] Assignee: Firma Rheinmetall GmbH, Dusseldorf, Germany

[22] Filed: Sept. 1, 1972

[21] Appl. No.: 285,802

[30] Foreign Application Priority Data
Oct. 7, 1971 Germany............................ 2149980

[52] U.S. Cl.................................. 33/241, 356/252
[51] Int. Cl............................. F41g 1/32, F41g 1/42
[58] Field of Search...... 33/241; 240/6.41; 356/251, 356/252

[56] References Cited
UNITED STATES PATENTS

| | | | |
|---|---|---|---|
| 802,277 | 10/1905 | Fric...................................... | 33/241 |
| 1,353,151 | 9/1920 | Deming................................ | 33/241 |
| 2,472,809 | 6/1949 | Decker................................ | 350/10 |
| 3,524,710 | 8/1970 | Rickert.............................. | 356/251 |
| 3,552,819 | 1/1971 | Mandler............................. | 33/241 |
| 3,645,635 | 2/1972 | Steck................................. | 356/252 |

FOREIGN PATENTS OR APPLICATIONS 2,852  11/1902  Great Britain..................... 356/252

Primary Examiner—Louis R. Prince
Assistant Examiner—Richard R. Stearns

[57] ABSTRACT

A sighting means for a firearm with a lower tube for viewing the target and an upper tube containing a so-called light rod and producing light emission from its rear end to produce a light image for sighting in the eye of a marksman via an optical system and mirror within the lower tube, the light rod being located within a cover at the forward end of the upper tube and being arranged for illumination by incident ambient light and/or a light emitting source within the cover.

4 Claims, 4 Drawing Figures

SIGHTING MEANS FOR FIREARMS

BACKGROUND OF THE INVENTION

This invention relates to sighting means for firearms, for use under both day and night conditions.

For aiming firearms it has been proposed that a light mark such as a spot of light should be imaged at infinity and aligned in respect of the barrel of the firearm so that the target is hit at the sighted point under the light spot. In a known sighting apparatus of this kind the light mark is produced by a tubular unit which collects light entering from the outer surface of the rod and passes it to the end of the rod. The rod is mounted in a transparent cover at the front end of a tube facing the front of the gun, and the light emerging from the rod end is projected via a screen and optical mirror system to the eye of the marksman. The mirror system is arranged so that the image on the screen is apparently situated at infinity. This device is mounted in a housing comprising two tubes positioned one above the other, the device for the production of the light mark being situated in the upper tube and the marksman viewing the target through the lower tube and through a mirror means. This sighting apparatus has the disadvantage that it can only be used in bright daylight, as the brightness of the light mark decreases with that of ambient lighting. The mirror situated in the lower tube of this apparatus has also the disadvantage that some of the light of the light mark is not projected into the eye of the marksman but passes through the mirror, so that the brightness of the light mark is reduced and is not easily visible when sighting against a bright background.

SUMMARY OF THE INVENTION

According to this invention a sighting means for a firearm comprises:
  a. a housing having two tubes mounted one above the other, for viewing the target through a partly reflective mirror means in the lower tube;
  b. the upper tube having a light rod of which the light emitting rear end is imaged as a light mark in the eye of the marksman, via an optical system and via the mirror in the lower tube;
  c. the light rod being positioned in a cover, at the front end of the upper tube and illuminated by ambient incident light and/or by a light source provided in the cover.

The invention provides a convenient sighting apparatus which produces a light mark of high luminosity, both in bright sunlight and at night, and is thus usable under a wide variety of conditions.

To render the light mark as luminous as possible the light rod is thickened at its front end. A partial mirror coating having a higher degree of reflection can also be provided in the centre of the mirror, in the lower tube.

The light rod mounted in the translucent cover is preferably illuminated by the light entering from outside and by a light source situated around part of its length and in the form of glass tubes filled with tritium and covered so that they are opaque to the outside.

To control the incident light and prevent light from emerging forwards at night the front end of the upper tube is in the form of a dome and is provided with a screen or may be covered by an opaque cap.

In another version of the invention the light rod provided in the non-translucent cover can be illuminated by the incident light and by a light source which is situated in the interior of the tube and which is in the form of a tritium-filled glass tube, while the dome is opaque.

In this version a movable tubular screen provided on the outside and around the light rod enables the amount of ambient light and/or light from the source to be adjusted.

As a further development of the invention the lower tube of the housing is constructed so that a telescopic sight can be screw fitted or otherwise mounted thereon.

BRIEF DESCRIPTION OF THE DRAWINGS

The invention is illustrated by way of example with reference to the accompanying drawings; wherein.

DESCRIPTION OF PREFERRED EMBODIMENTS

Figure 1:
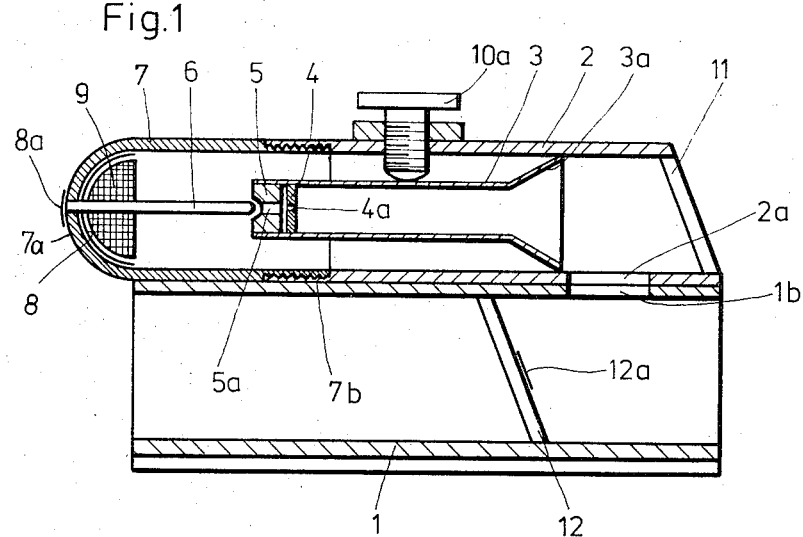
FIG. 1 is a longitudinal section through a first sighting means.

The sighting device of this invention has a housing with a lower tube 1 and an upper tube 2. The lower tube has a dovetail recess guide 1a enabling the sighting apparatus to be fitted to the firearm. The upper tube 2 contains an adjusting sleeve 3 with a widened rear end 3a resting against the tube 2, the other front end has a screen 4 with an aperture 4a, in front of which is situated a disc 5, for centering a light rod 6. A cover 7 is preferably of translucent or transparent plastic but which may also be opaque, is screwed into the tube 2 by means of a thread 7b, and the dome 7a of the cover has a reflective coated lining 8 which prevents light from passing forwards and also reflects onto the surface of the light rod the light produced by a light emitting source 9. An opaque lining 8a, which covers at least the front end of the light rod 6, is provided on the outside of the dome 7a. The light rod is an acrylic plastic, which has the property of diffusing the light entering the outer surface and producing visible light from any ultra violet light contained therein, as a result of which the light rod may be regarded as a light amplifier. The light entering the outer surfaces of the light rod 6 is passed to the end surfaces and forms a ray for the sighting apparatus via the aperture 5a of the disc 5 and the aperture 4a of the screen 4. The aperture 4a in the screen 4 is viewed as a light spot passing via a mirror 11 and the aligned apertures 1b and 2a in the upper and lower tubes onto the partly translucent mirror 12 and from there to the eye of the marksman. The mirror 11 is preferably curved with the aperture 4a of the screen situated at the focal point. This produces a virtual image of the aperture 4a of the screen at the eye of the marksman, apparently located at infinity. Needless to say, the mirror 11 can also be constructed as a plane mirror with an optical lens system fulfilling the same process being provided in the ray path of the sighting apparatus. In one preferred embodiment a mirror-coated surface 12a is provided in the centre of the partly translucent mirror 12 and is likewise partly translucent but has a higher degree of reflection than the remaining surface portion of the mirror 12. This prevents any excessive light of the light mark from passing through the mirror 12 and the corresponding loss of brightness. To enable the light to be aligned in the lateral and vertical directions, in respect of the firearm, adjusting screws 10a and 10b are provided, these acting on the adjusting sleeve 3, by conventional means known per se, for example, opposing springs, (not shown) not constituting the present invention As mentioned, the cover 7 is preferably made of transparent plastic, in which case the external light, such as daylight, enters through the cylindrical part of the cover while the light source already mentioned is provided inside the dome 7a. The light source preferably consists of a tritium-filled glass element which emits safe radio-active radiation and produces green light when encountering a phosphorus element. This light, as the incident light from outside, passes through the surface of the light rod 6 and produces an illuminated point at its end surface. It is therefore possible, under certain circumstances, to dispense completely with the incident light from outside, for the production of a light mark, and to make the cover 7 completely opaque.

In order to enable the advantage of the apparatus to be used for long range firing a further development of the invention provides that a sighting telescope attachment can be threaded or otherwise mounted into the front end of the tube 1. In this case the sighting apparatus is used exactly as before, since the light mark need only be aligned to the target viewed through the telescope sight, in order to ensure accurate firing.

Figure 3:
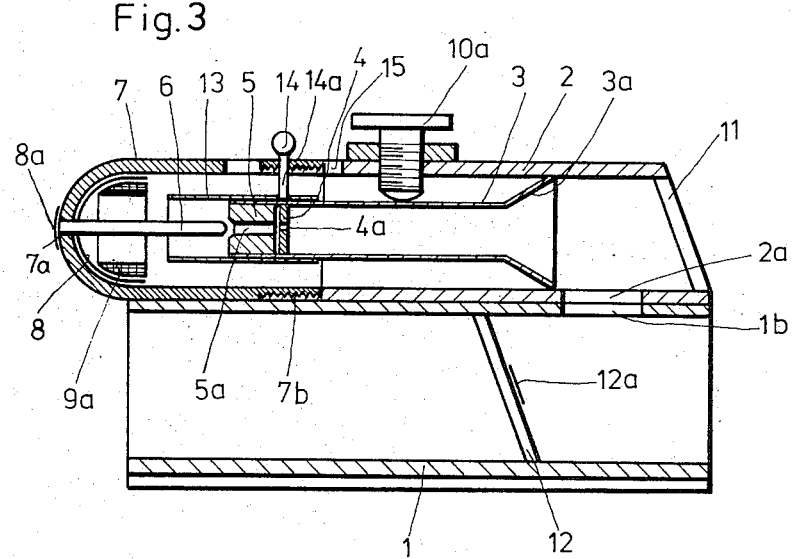
FIG. 3 is a longitudinal section through a second version of the sighting means.
Figure 2:
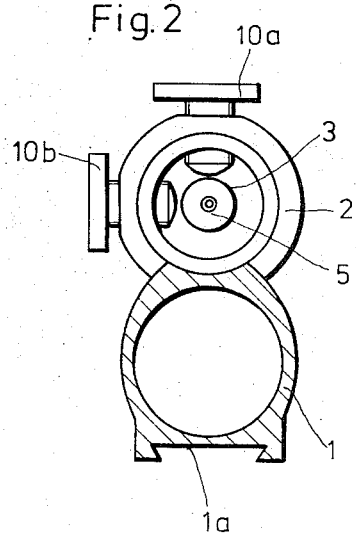
FIG. 2 is a section on line I—I of FIG. 1.

The version shown in FIG. 3 is similar to that of FIGS. 1 and 2 but to enable the brightness of the light mark to be easily adjusted to the external light conditions, a tubular screen 13, movable axially by means of a knob 14, mounted on the sleeve 3 so that incident daylight and/or light from the source 9a can be adjusted. For this purpose a lever 14a, affixed to the screen 13, passes through slit 15 to the outside. The light source 9a in this case has an internal diameter such that the screen 13 can be moved into same.

Figure 4:
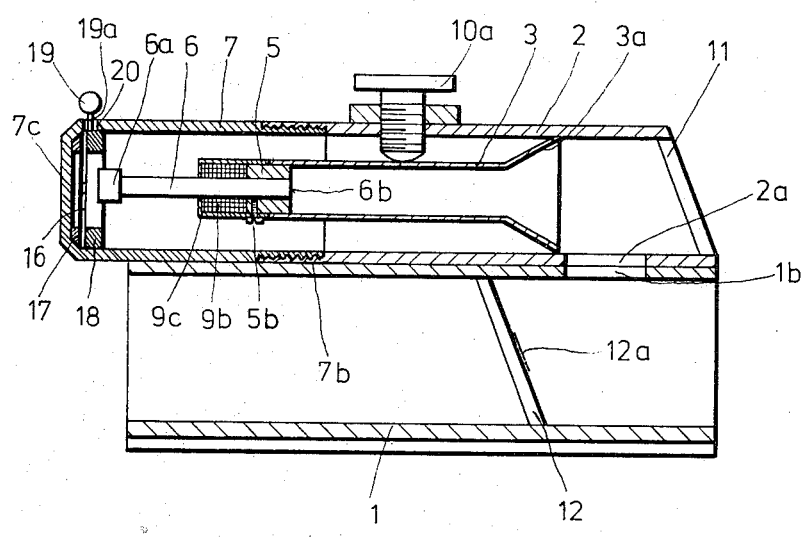
FIG. 4 is a longitudinal section through a third version of the sighting means.

In FIG. 4 a light source 9b comprises tritium-filled glass tubes in an opaque part 9c, which is mounted onto the disc 5 and affixed by means of screw 5b. The light rod 6, which is thicker than that shown in FIGS. 1 to 3, is provided at its rear end 6b with a very fine reticle for more accurately sighting. The light rod 6 is clamped in the centering disc by the screw 5b after the reticle has been appropriately adjusted. In order to make the incident light through the front end 6a of the light rod 6 as great as possible the end 6a has a cylindrically or spherically thickened portion. It has been found that when aim is being taken from dark spaces at brightly illuminated targets the incident light encountering the cylindrical surfaces of the light rod from the side is insufficient to produce a bright light mark, so that an attempt is made to ensure the maximum incident light into the front end surface of the light rod, by means of the thickened construction for this end.

The dome 7c of the cover has a flattened construction to achieve this which increases the incident light from the front.

In order to ensure that the front end 6a of the light rod 6 will not be visible at night the dome 7c of the cover can be covered by means of a cap. For preference, however, an iris diaphragm is provided in the dome 7c of the cover, making it possible, in addition to completely covering the front end 6a at night, to adjust the incident light entering from the front. For this purpose an operating knob 19 is provided on the outside, to which a lever 19a is connected, via a slit 20 in the cover 7. The rotatable ring 18, displaces the blades 16 of the diaphragm and the fixed ring 17 of the diaphragm is secured to the dome 7c of the cover.

I claim:
1. A sighting device for a firearm, comprising
a partially reflective mirror,
a housing having two tubes mounted one above the other, the lower of said tubes being arranged for viewing the target through said partially reflective mirror positioned therein,
a light rod having a luminous rear facing end,
the upper of said tubes containing said light rod,
an optical means for directing an image of said luminous rear facing end on to said mirror in said lower of said tubes,
a translucent cover disposed at a forward end of said upper of said tubes,
a light emitting source disposed within said cover,
said light rod being located within said cover at said forward end of said upper of said tubes being illuminated by incident ambient light and by said light emitting source, respectively,
said light rod being thickened at its front end to increase the light received from a forward direction, said light source being annularly located around a portion of the length of said light rod,
said light source being in the form of glass tubes filled with tritium, and having an outer periphery,
an opaque covering means covering said outer periphery of said light source,
an adjustable screen means disposed in said cover adjacent a front end thereof and adjacent said thickened end of said light rod and movable for adjusting said incident ambient light entering from the forward direction,
said front end of said cover receives an opaque covering cap,
a partial mirror coating having a reflectability greater than that of said partially reflective mirror in the lower of said tubes, being disposed at a center portion of said partially reflective mirror, and
the lower of said tubes being adapted to receive a telescopic sight.
2. The apparatus as set forth in claim 1, wherein
said adjustable screen means is disposed between said thickened end of said light rod and said front end of said cover and comprises blades,
operating means extending to an outside of said cover for moving said blades in front of said thickened end of said light rod.
3. The apparatus as set forth in claim 2, wherein
said operating means includes a first ring rotatably mounted in said cover and a lever connected to said ring, said cover having a circumferential slit through which said lever extends, and
said blades are connected to said rotatable ring.
4. The apparatus as set forth in claim 3, further comprising
a second ring secured to said cover and disposed adjacent said blades on a side thereof opposite to that of said first ring.

* * * * *